United States Patent [19]

Bosche et al.

[11] 4,159,220

[45] Jun. 26, 1979

[54] APPARATUS AND METHOD FOR VIBRATION SEALING

[75] Inventors: Eugene R. Bosche, Plymouth; Earl W. Walke, Jr., Wixom, both of Mich.

[73] Assignee: Ex-Cell-O Corporation, Troy, Mich.

[21] Appl. No.: 883,766

[22] Filed: Mar. 6, 1978

Related U.S. Application Data

[63] Continuation of Ser. No. 652,916, Jan. 28, 1976, abandoned.

[51] Int. Cl.$^2$ .......................... B65G 59/06; B65H 3/24
[52] U.S. Cl. ...................................... 156/73.1; 53/373; 53/479; 93/44.1 GT; 156/358; 156/580.1; 156/580.2
[58] Field of Search ...................... 156/73.1, 73.4, 306, 156/311, 358, 581, 580.1, 580.2; 228/1 R, 110; 53/39, 44, 373, 479; 93/36.3, 44.1 GT, DIG. 1

[56] References Cited

U.S. PATENT DOCUMENTS

| | | | |
|---|---|---|---|
| 3,499,808 | 3/1970 | Obeda | 156/580.2 X |
| 3,666,602 | 5/1972 | Obeda | 156/580.2 |
| 3,697,357 | 10/1972 | Obeda | 156/580.1 |
| 3,905,280 | 9/1975 | Egleston et al. | 156/580.1 X |
| 3,910,014 | 10/1975 | Braun | 156/581 X |
| 3,956,046 | 5/1976 | Tsuchiya et al. | 156/73.4 |
| 3,956,975 | 5/1976 | Egleston et al. | 156/73.1 X |
| 3,971,300 | 7/1976 | Bachner | 93/36.3 |

*Primary Examiner*—Michael G. Wityshyn

*Attorney, Agent, or Firm*—Reising, Ethington, Barnard, Perry & Brooks

[57] ABSTRACT

A method and apparatus for forming a seal between layers of thermoplastic coated paperboard or the like wherein there are different numbers of layers and varying thicknesses at different locations within the area to be sealed. The apparatus includes an anvil having a work surface for engaging one outer surface of the layers and a horn that vibrates at a predetermined frequency when energized. The horn has a work surface that opposes the work surface of said anvil. A control circuit is operable for sequentially; (1) pre-triggering said horn, to energize it and cause it to vibrate; (2) moving said anvil and energized horn into the sealing position to clamp the paperboard layers therebetween and maintaining the clamping pressure over the entire area of the layers within predetermined limits, (3) holding the energized horn in the sealing position with respect to the anvil for a predetermined period of time to cause the thermoplastic coating of the paperboard layers between the work surfaces to be activated to flow, (4) deenergizing the horn to terminate the vibration thereof, (5) holding the anvil and deenergized horn in the sealing position with the paperboard layers clamped between the work surfaces thereof for a predetermined period of time to permit the activated thermoplastic coating to set, and (6) retracting the horn and anvil with respect to each other to unclamp the sealed paperboard layers.

5 Claims, 4 Drawing Figures

APPARATUS AND METHOD FOR VIBRATION SEALING

This is a continuation of application Ser. No. 652,916, filed Jan. 28, 1976, now abandoned.

BACKGROUND OF THE INVENTION

1. Field of the Invention

The present invention relates generally to packaging methods and apparatus, and is particularly concerned with an improved method and apparatus for sealing cartons or containers of thermoplastic coated paperboard material.

2. Description of the Prior Art

The present invention is particularly concerned with an apparatus and method for sealing cartons or containers of the type made of paperboard stock coated on both sides with a thermoplastic material such as polyethylene. The thermoplastic coating on the paperboard is utilized not only as moisture proofing material, but also serves as a heat and pressure sensitive adhesive which cooperates in sealing the closure elements of the container so as to make the container fluid tight when it is filled with milk or other contents, and sealed and closed. An example of this general type of container is disclosed in U.S. Pat. Nos. 3,120,089 and 3,910,014.

Until recently, the conventional manner of sealing thermoplastic coated paperboard cartons was to bring the layers of the end closures of the container into contact with each other, and by the application of heat, activate the thermoplastic coating to cause it to flow at the portions to be joined and sealed. When the thermoplastic material cools and sets, the layers are sealed and adhesively secured together. In addition to requiring the use of elaborate and expensive apparatus for generating the considerable amount of energy required, elaborate apparatus, methods and systems are also required to dissipate the heat from the plant in which the packaging operation is being carried out. Examples of this general type of packaging apparatus are shown in U.S. Pat. Nos. 3,002,328; 3,120,089; 3,166,994, 3,187,647; 3,239,995 and 3,309,841.

U.S. Pat. Nos. 3,905,280 of Sept. 16, 1975 and 3,910,014 of Oct. 7, 1975 disclose apparatus for sealing the ends of thermoplastic coated paperboard containers by vibration welding wherein mechanical energy is converted into localized heat energy to minimize the amount of heat and energy required, and to eliminate the necessity for expensive systems and methods for dissipating the excess heat. U.S. Pat. No. 3,526,792 discloses an ultrasonic transducer having a converter for converting electrical energy into mechanical energy, and a concentrating horn for concentrating the mechanical energy into vibrations at a desired frequency. In the above mentioned U.S. Pat. Nos. 3,905,280 and 3,910,014, the horn of the vibration welding apparatus vibrates at a predetermined frequency when energized, and cooperates with an anvil to clamp the layers of the thermoplastic coated paperboard between the working surface of the horn and the back-up or work surface of the anvil. When the thermoplastic coated paperboard layers are clamped between the work surfaces of the horn and anvil, the vibration of the horn creates frictional heat sufficient to activate the thermoplastic coating of the layers to cause the thermoplastic material of the layers to flow together. When the vibration is terminated, the thermoplastic will cool and set to seal the layers and secure the layers together throughout the area of the seal. Among the advantages of the utilization of vibration welding is that the heat generated by the vibration of the horn is concentrated in the area to be sealed, and little, if any, excess heat is required to be generated to perform the sealing operation.

There are two stages in the sealing operation of thermoplastic coated paperboard containers by vibration welding. These stages are: (1) the activation stage in which the friction of the vibrating horn generates heat sufficient to activate the thermoplastic coating to cause it to flow, and (2) the cooling stage wherein the layers remain clamped between the horn and anvil with the horn deenergized to permit the previously activated thermoplastic coating to cool and set to form the seal. Thus, a complete cycle of forming a seal between layers of a thermoplastic coated paperboard carton involves (1) bringing the working surfaces of the anvil and horn into opposed relationship on opposite sides of the layers to be sealed, (2) activating the thermoplastic coating of the layers between the work surface by frictional heat to cause the coating of the layers to flow together, (3) permitting the previously activated thermoplastic material to cool and set while still held between the working surfaces of the anvil and deenergized horn, and (4) separating the working surfaces of the anvil and horn to remove the carton layers after the seal has been formed. The time involved per cycle to date has been in the range of approximately one-half to two seconds, depending upon the thickness of the paperboard, the thickness of the thermoplastic coating, the number of layers, and the surface area to be sealed.

It has been conventional in a vibration welding operation of this type to pressure actuate the horn to start the horn vibrating; that is, as the working surface of the horn moves into contact with the layers to be welded together, the horn starts vibrating when a predetermined pressure on the working surface of the horn is sensed by the horn actuating controls.

The pressure over the entire area to be sealed must be maintained within predetermined limits. If the pressure is too low, the friction between the vibrating horn and the paperboard layers will be insufficient to generate enough heat to activate the thermoplastic coating to flow. If the pressure is excessive, burning will occur, that is, the thermoplastic coating will be removed at high pressure points to destroy the seal.

Another problem that can occur when there is excessive clamping pressure between the horn and anvil is that some vibration may be transmitted to the anvil. If this occurs, the friction between the horn and paperboard layers will be reduced because of the resulting reduction in the relative motion between the vibrating horn and the paperboard layers. Stated another way, excessive pressure will tend to cause vibration of the anvil with the horn so that the paperboard layers will tend to move with the horn instead of frictionally reacting against the vibrating horn. The reduction in friction will reduce the possibility of generating heat sufficient to activate the thermoplastic, or at least will extend the time required to activate the thermoplastic coating. The likelihood of this occurring increases as the mass of the anvil decreases; an anvil with a small mass relative to the horn will have a greater tendency to start vibrating than would be the case with an anvil having a relatively large mass.

A significant factor in determining the production rate is the amount of time required in the sealing operation which, as alluded to above, involves both an activation and cooling stage. When a carton is at the welding station, and the layers to be sealed are clamped between the horn and anvil, inadequate cooling time after deenergization of the horn with the layers remaining clamped between the horn and anvil increases the likelihood that the layers will separate before the thermoplastic coating sets, and thus prevent formation of a seal. In a high production packaging system, the available time for the sealing operation is determined primarily by the speed at which the cartons must pass through the welding cycle as determined by the speed of other machines in the total system. For example, the welding apparatus must be incorporated into a system including machines for feeding and erecting cartons from flat blank form, such as machines of the type disclosed in Allen U.S. Pat. No. 3,599,541 of Aug. 17, 1971 and in Kellogg U.S. application Ser. No. 489,880, filed July 19, 1974, now U.S. Pat. No. 3,937,131, and filling and closing apparatus such is disclosed in Braun U.S. Pat. No. 3,910,014.

SUMMARY OF THE INVENTION

An object of this invention is to increase the production rate of systems for forming, filling and sealing cartons of thermoplastic coated paperboard by vibration welding of the ends of the cartons to form a seal by reducing the amount of time required to activate the thermoplastic material during the sealing operation.

A further object of this invention is to provide an improved method and apparatus for forming the seal between a plurality of layers of thermoplastic coated paperboard wherein there are a different number of layers at different portions of the area to be sealed, and hence variations in the thickness of the area to be sealed, wherein the time necessary to activate the thermoplastic coating during the vibration welding stage of the sealing operation is reduced to provide increased cooling time during the sealing operation to decrease the likelihood of the layers separating when unclamped from between the surfaces of the horn and anvil of the vibration welding apparatus.

In carrying out the foregoing, and other objects, apparatus according to the present invention includes an anvil having a work surface for engaging one outer surface of the layers of thermoplastic coated paperboard to be sealed and a horn that vibrates at a predetermined frequency when energized. The horn has a work surface that engages the opposite outer surface of the layers. The horn and anvil are mounted for movement relative to each other between a retracted, inactive position and an extended, sealing position in which the opposed work surfaces engage the paperboard layers in a clamping relationship.

The apparatus has control means for energizing the horn and moving the horn and anvil relative to each other. When the paperboard layers of a carton are located between the work surfaces of the horn and anvil, the control means sequentially (1) energizes the horn, (2) causes the energized horn and anvil to move into the sealing position to clamp the paperboard layers therebetween, (3) holds the energized horn and anvil in the sealing position for a predetermined period of time to activate the thermoplastic coating of the paperboard layers to flow, (4) deenergizes the horn to terminate the vibration thereof with the deenergized horn and anvil held in the sealing position a predetermined period of time to permit the thermoplastic material to cool and set, and (5) retracts the horn and anvil with respect to each other. The clamping pressure of the anvil and horn work surfaces over the entire area of the paperboard layers is maintained within the predetermined limits.

Other objects, advantages and features of the invention will become apparent from the following description taken in connection with the accompanying drawings.

DESCRIPTION OF THE PREFERRED EMBODIMENTS

Figure 1:
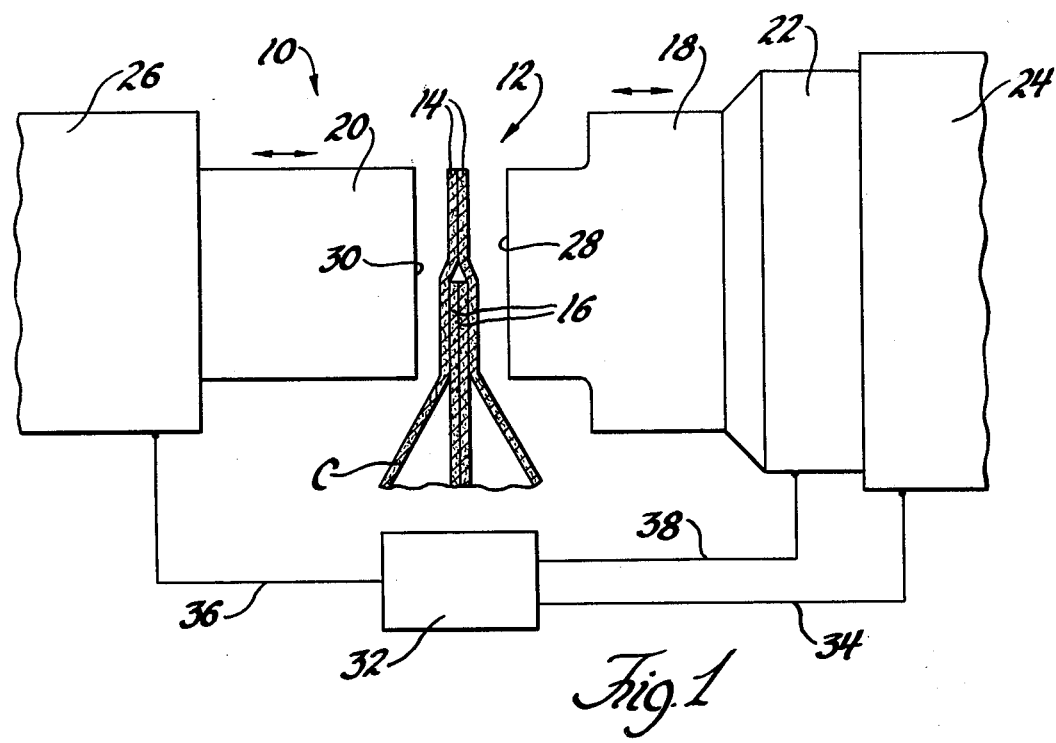
FIG. 1 is a schematic view of one form of apparatus embodying the invention with a gabled top of a thermoplastic coated paperboard container illustrated in cross section and disposed to be sealed by the apparatus.

In FIG. 1 reference numeral 10 collectively desinates apparatus embodying the present invention for sealing the gabled top 12 of a thermoplastic coated paperboard carton C. The carton top 12 includes outer layers 14 of the thermoplastic coated paperboard that engage each other adjacent the upper extremity of the carton top as well as inner layers 16 of the coated paperboard positioned between the outer layers below the upper extremity of the carton top. The apparatus 10 includes a vibrating horn 18 and an anvil 20. The horn 18 is mounted on a vibrator 22 that is slidably mounted with a stationary cylinder 24 for movement to the left and the right as viewed in FIG. 1. The anvil 20 is likewise mounted within a stationary cylinder 26 for slidable movement to the left and to the right. The horn 18 has a generally flat work surface 28 that opposes a generally flat work surface 30 of the anvil 20. When a carton top 12 is located between the work surfaces 28 and 30, the anvil and horn may be actuated to move toward each other to a sealing position in which the surfaces 28 and 30 engage opposite sides of the carton top 12 in a clamping relationship.

A control circuit 32 is schematically illustrated in FIG. 1 and is connected to the cylinder 24 by a wire conduit or other electrical conductor 34 so as to control the retracting and extending movement of vibrator 22 within the cylinder. Likewise, the control circuit 32 is connected by a wire conduit or other electrical conductor 36 to the cylinder 26 to control retracting and extending movement of anvil 20 within cylinder 26. A wire conduit or other electrical conductor 38 also connects the control circuit with the vibrator 22 so as to commence and terminate its vibration.

The anvil 20 and horn 18 may be located at a welding and sealing station through which a conveyor (not shown) for the carton C passes. When a carton C is not located at the welding and sealing station, the anvil 20 and horn 18 are in their retracted positions, that is, the anvil 20 is located in its extreme left-hand position and the horn 18 is located in its extreme right-hand position as viewed in FIG. 1. When a carton C is moved into the position shown in FIG. 1 with the carton top 12 positioned between the opposed work surfaces 28 and 30, the control circuit 32 is actuated. The control circuit 32 may be actuated by a switch or the like located to be engaged by a carton as it is advanced by a conveyor to the welding and sealing station between the anvil and horn, in the manner illustrated, for example, in FIG. 11 of U.S. Pat. No. 3,905,280.

When the control circuit 32 is actuated, the cylinders 24 and 26 are energized so as to move the horn 18 and the anvil 20 toward each other to the extended sealing position. Before the horn 18 engages the right-hand outer thermoplastic coated paperboard layer 14, it is "pre-triggered," that is, the vibrator 22 is energized by the control circuit which in turn energize the horn and cause it to vibrate at a predetermined frequency (for example, 20,000 cycles per second). The work surface 28 of the horn is thus vibrating as it moves into engagement with the right-hand carton layer 14. Simultaneously with the engagement of the work surface 28 of the vibrating horn with the carton top 12, the work surface 30 of the anvil moves into engagement with the left-hand outer carton top layer 14.

As the horn and anvil move their respective work surfaces into clamping engagement with the paperboard layers of the carton top 12, the work surfaces 28 and 30 sequentially engage the thickest lower portion containing layers 16 and then the thin upper portion containing only the layers 14. A higher clamping pressure will exist at the thick lower portion than at the thin upper portion. Therefore, the minimum pressure required to cause sufficient friction to activate the thermoplastic coating will first be reached at the thick portion, and the thermoplastic at the thick portion will start to flow before the thermoplastic at the thin portion. When the pressure at the thin upper portion containing only the layers 14 reaches the minimum required to activate the thermoplastic, the clamping movement of surfaces 28 and 30 toward each other stops to prevent excessive pressure at the thick lower portion containing the inner layers 16. The control circuit 32 then operates to deenergize the horn and stop vibration thereof. The anvil and deenergized horn are then held in the sealing position with the carton top layers clamped between work surfaces 28 and 30 for a predetermined period of time to permit the activated thermoplastic to cool and set and thereby form a seal between the carton top layers.

The above sequence of operation including pre-triggering of the horn 18 prior to its engagement with the paperboard layers of the carton top 12 reduces the time required per welding cycle in the range of 20 to 30 milliseconds, or by 10 to 15%, which is a significant increase in a mass production system.

As alluded to previously, the pressure must be maintained within predetermined limits over the entire area to be sealed, including, in the case of FIG. 1, the lower thick portion having four layers 14 and 16 as well as the upper thin portion having only two layers 14. It has been found that the minimum pressure required to generate sufficient frictional heat to activate the thermoplastic coating, is approximately 200 psi, assuming the horn to be vibrating at a frequency 20,000 cycles per second. With the same frequency, it has been found that the maximum pressure must not exceed approximately 780 psi. Therefore, in FIG. 1, the pressure at the upper, two layer portion of the carton top 12 must reach at least 200 psi before the pressure at the lower, four layer portion reaches 780 psi. Since, in FIG. 1, the work surfaces 28 and 30 are flat, the thickness of the paperboard must be such as to permit adequate clamping pressure between surfaces 28 and 30 (i.e. a minimum of 200 psi) at the two layer portion with the pressure at the four layer portion staying in the 200 to 780 psi range. If the control circuit 32 prevents the clamping pressure from exceeding the maximum pressure of 780 psi, a seal will not be formed at the thin, two layer portion unless the pressure there reaches the minimum pressure of 200 psi. Therefore, the permissible variation in the thickness over the area to be sealed is that which permits the clamping pressure between surfaces 28 and 30 over the entire area to fall within the predetermined limits of from approximately 200 psi to approximately 780 psi in the case of a horn frequency of 20,000 cycles per second.

In the illustrated embodiment of FIG. 1, the thickness of each layer of the paperboard is such that the difference in the thickness between the two layer portion and the four layer portion permits a clamping pressure in both portions in the range between the predetermined minimum and maximum permissible pressure, which as discussed above have been found to be approximately 200 psi and 780 psi, respectively, when the horn vibrates at a frequency of 20,000 cycles per second.

Most thermoplastic coated paperboard cartons at present are made from paperboard having a thickness in the range of 0.012 inches to 0.028 inches including a coating of polyethylene (or other thermoplastic material) having a thickness in the range of 0.00075 inches to 0.001 inches. As the variation in the thickness of the layers to be sealed increases, due for example to the use of the thicker paperboard and/or abrupt changes in the number of layers, the clamping pressure variation will increase and it will become more difficult to maintain the pressure within the required limits between the flat work surfaces 28 and 30.

Thus, in FIG. 1, assuming that the horn 18 vibrates at a frequency of 20,000 cycles per second when energized, the variation in thickness between the two layer portion of the carton top 12 containing only layers 14 and the four layer portion containing the layers 16 is small enough to permit the clamping pressure to fall within the 200 to 780 psi range in both portions.

Figure 2:
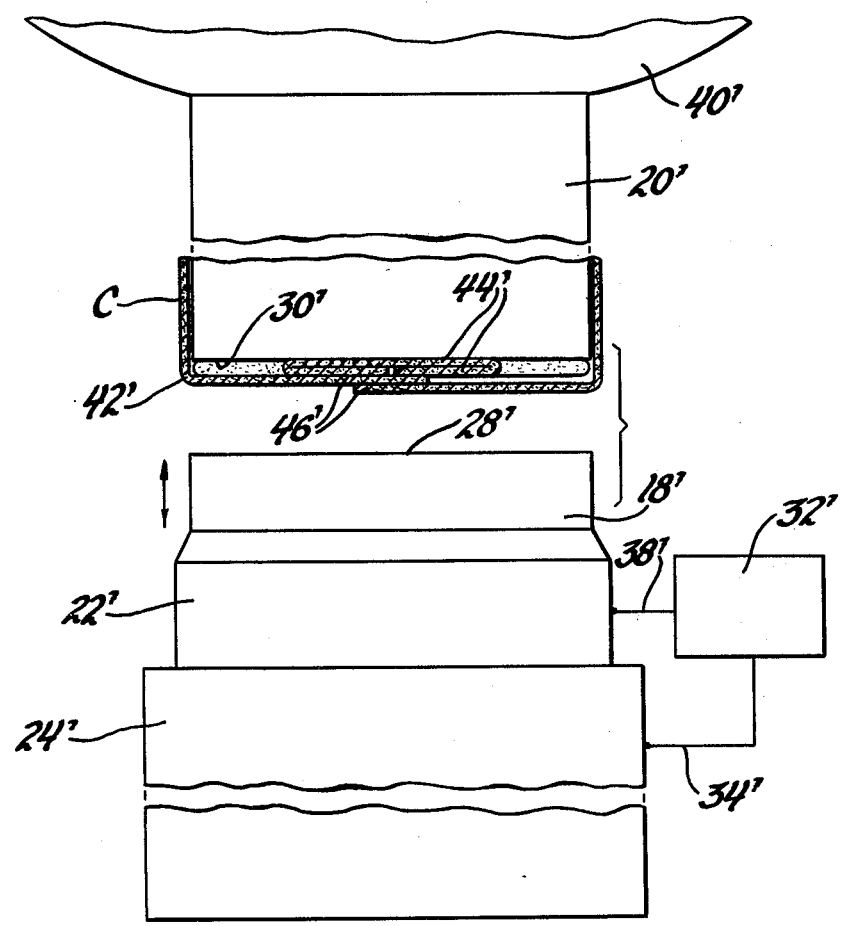
FIG. 2 is a schematic view of another form of apparatus embodying the invention with a flat end portion of a container shown in cross section to be sealed by the apparatus.

FIG. 2 shows another version of the apparatus that is similar to the version shown in FIG. 1 and, consequently, has its components indicated by corresponding primed numerals. However, in this version of the apparatus, only the vibrator 22' and its supported vibrating horn 18' are mounted for retracting and extending movement. The anvil 20' is in the form of a mandrel and is mounted on a rotatable member 40' so as to carry the bottom 42' of a thermoplastic coated paperboard food carton C into alignment with the horn. The carton bottom 42' is defined in a conventional manner by folding sides of the carton along score lines and includes inner layers 44' as well as overlapped outer layers 46'. The carton bottom thus has three layers except where the outer layers overlap to provide a total of four layers.

The sealing of the carton bottom 42' proceeds in the same manner as described in connection with the FIG. 1 embodiment for sealing the carton top. The cylinder 24' moves the vibrator 22' and its horn 18' upwardly toward the carton bottom from the retracted position shown. Prior to engagement of the work surface 28' of the horn with the carton bottom, the control circuit 32' causes the vibrator 22' to vibrate the horn. The opposed work surfaces 28' and 30' of the horn and the mandrel thus clamp the layers 44' and 46' of the carton board with the cylinder 24' exerting a force that pressurizes all of the layers while maintaining the pressure within predetermined limits. The horn vibration activates the thermoplastic coating of the pressurized layers to flow. The horn vibration is then terminated while maintaining the clamped condition of the carton bottom so that the activated thermoplastic coating of the layers can cool and solidify so as to form the seal between the layers. After formation of the seal, the horn and vibrator are moved back to their retracted position and the rotatable member 40' is then actuated to move the sealed carton bottom to an unloading station and to position another carbon bottom to be sealed in alignment with the horn.

Figure 3:
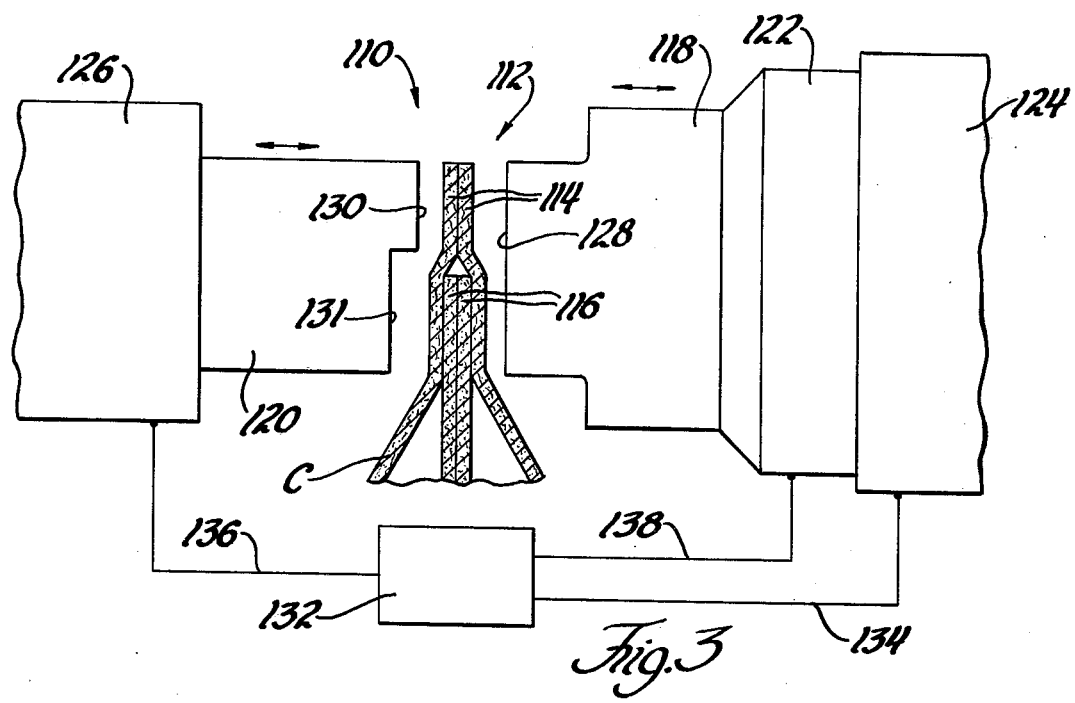
FIG. 3 is a schematic view of still another form of apparatus embodying the invention with a gabled top container of thermoplastic coated paperboard material disposed to be sealed by the apparatus.

FIG. 3 illustrates an embodiment in which the work surface of the anvil is stepped to accommodate variations in the thickness of the layers of the carton top in the area to be sealed. Consequently, a greater variation in the thickness of the layers is possible while still maintaining the clamping pressure within the range between the minimum and maximum pressures.

In FIG. 3, the apparatus is indicated collectively by reference numeral 110. Parts corresponding to the FIG. 1 embodiment have the same reference numerals increased by 100. The carton C has a top portion 112 located between the work surfaces of a horn 118 and an anvil 120.

The work surface of the anvil 120 is stepped as indicated by reference numeral 131 to accommodate the extra thickness provided by layers 116 at the four layer portion. Consequently, there is a more uniform distribution of pressure over the two layer and four layer portions of the carton top 112 when the horn 118 and anvil 120 are in the clamped, sealing position. A greater variation in thickness over the area to be sealed can be accommodated by the FIG. 3 apparatus.

Figure 4:
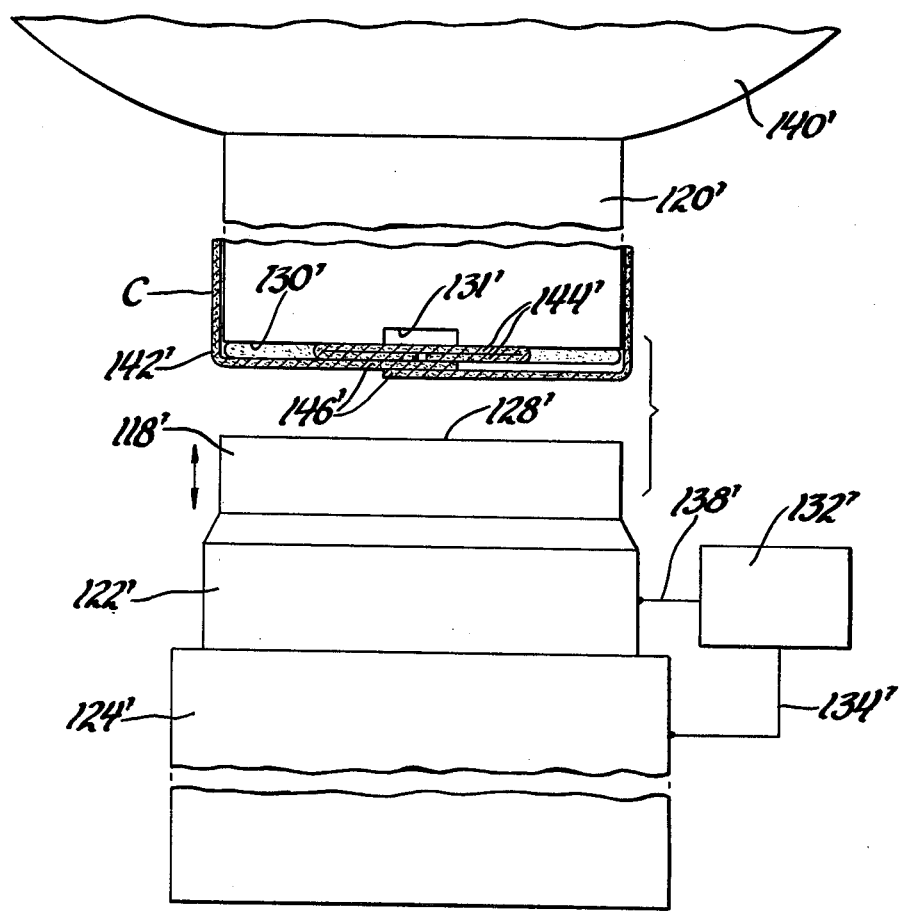
FIG. 4 is a schematic view of still another form of apparatus embodying the invention with a flat end portion of a thermoplastic paperboard container disposed to be sealed by the apparatus and illustrated in cross section.

FIG. 4 illustrates an embodiment similar to FIG. 2 except that the work surface of the anvil is stepped to accommodate variations in thickness. Parts corresponding to the FIG. 2 embodiment have the same reference numeral raised by 100.

The work surface 130' of the anvil 120' is stepped or recessed as indicated by reference numeral 131' to accommodate the thickest portion at the overlapped layers 146'.

The embodiments of FIGS. 3 and 4 operate the same as FIGS. 1 and 2. In both FIGS. 3 and 4, it is obvious that the work surface of the horn could be stepped instead of the work surface of the anvil. Also, both work surfaces can be stepped if desired.

While specific forms of the invention have become illustrated and described in the foregoing specification and accompanying drawings, it will be apparent to those skilled in the art that the invention is not limited to the exact construction shown, and that alterations and modifications in the construction and arrangement of parts, all falling within the scope and spirit of the invention, can be made by those skilled in the art.

The embodiments of the present invention in which an exclusive property or privilege is claimed are defined as follows:

1. In a method of forming a seal in a sealing area between the layers of end closures of thermoplastic-coated paperboard cartons in a mass production system by vibration welding wherein the welding cycle includes an activation stage in which the thermoplastic coating of the layers in the sealing area is thermally activated to flow, and a cooling stage in which the layers of the sealing area with activated thermoplastic are clamped together until the thermoplastic cools and sets to form a seal, the improvement comprising: sequentially moving each carton into a position at a welding and sealing station in which the layers of the sealing area of the end closure are disposed between the spaced apart work surfaces of a vibrating horn and an anvil with the layers of the sealing area arranged such that the thickness variations permit clamping pressure to be applied to the layers over the entire sealing area within predetermined minimum and maximum limits, the maximum limit and the minimum limit defining a range of clamping pressures, without penetrating the layers; pre-triggering the horn to cause it to vibrate at a predetermined frequency that will cause thermal activation of the thermoplastic coating of the layers in the sealing area between the clamping surfaces when the clamping pressure is within said predetermined minimum and maximum limits; moving the work surfaces of the anvil and vibrating horn into opposed, clamping relationship with said layers until the clamping pressure on the portions of the sealing area of minimum thickness reaches said predetermined minimum pressure, stopping the movement of the work surfaces toward each other to prevent the clamping pressure of the portions of the sealing area of maximum thickness from exceeding the predetermined maximum pressure; holding the work surfaces in said clamping and sealing position for a predetermined period of time to cause the thermoplastic coating to be activated to flow, the clamping pressures in certain portions of the sealing area being allowed to vary within said range from clamping pressures in other portions of the sealing area; then deenergizing the horn to stop the vibration thereof while the work surfaces of the horn and anvil remain in the clamping and sealing position; holding the anvil and deenergized horn in said clamping and sealing position for a predetermined period of time to permit the activated thermoplastic to cool and set; and then separating the work surfaces of the anvil and deenergized horn to permit the carton with the sealed end closure to be moved from the welding and sealing station.

2. In a method of forming seals between layers of a sealing area of end closures of thermoplastic coated paperboard cartons in a mass production system by vibration welding wherein the paperboard of the cartons has a thickness in the range of 0.012 inches to 0.028 inches and has a coating of thermoplastic material with a thickness in the range of 0.00075 inches to 0.001 inches and wherein the welding cycle includes an activation stage in which the thermoplastic coating of the layers in the sealing area is thermally activated to flow and a cooling stage in which the layers of the sealing area with activated thermoplastic are clamped together until the thermoplastic cools and sets to form a seal, the improvement comprising: sequentially moving each carton into a position in which the layers of the sealing area of the end closure are disposed between the spaced apart work surfaces of a vibrating welding horn and an anvil with the end closure folded closed with the variation in the thicknesses of the layers in the sealing area such that a minimum clamping pressure of 200 psi can be applied to the portions of the sealing area of minimum thickness while at the same time the pressure in the portions of the sealing area of maximum thickness does not exceed a maximum clamping pressure of 780 psi, the minimum and maximum clamping pressures defining a range of clamping pressures, and wherein the layers are not penetrated by the work surfaces; pre-triggering the horn to cause it to vibrate at a frequency of 20,000 cycles per second; moving the work surfaces of the anvil and vibrating horn into a clamping and sealing position with the layers of the sealing area disposed between the opposed work surfaces until the pressure on the portion of the layers of the sealing area of minimum thickness reaches a minimum of 200 psi, stopping the movement of the work surfaces toward each other when the minimum pressure on the portions of the sealing area of minimum thickness reaches 200 psi, holding the layers of the sealing area between the work surfaces in the clamping and sealing position for a predetermined period of time to cause the thermoplastic coating of the sealing area to be activated to flow, the clamping pressures in the portions of the sealing area being allowed to vary within said range from the clamping pressures in the other portions of the sealing area; deenergizing the horn to stop the vibration thereof; holding the anvil and deenergized horn in said clamping and sealing position for a predetermined period of time to permit the activated thermoplastic to cool and set; and then separating the work surfaces of the anvil and deenergized horn to permit the carton with the sealed end closure to be moved from between the anvil and horn.

3. Apparatus for forming a seal between layers of an end closure of a thermoplastic coated paperboard carton in a sealing area of the end closure wherein the end closure is folded to its closed condition and there are different numbers of layers and hence varying thicknesses at different locations within the sealing area; a welding and sealing station at which is located an anvil and a vibration welding horn; said anvil having a work surface for engaging one outer surface of the layers of a carton end closure in the sealing area; said horn having a work surface for engaging the opposite outer surface of the sealing area; said horn being operable to vibrate at a predetermined frequency when energized; said anvil and horn being mounted at said welding and sealing station for movement relative to each other between a retracted inactive position and an extended clamping and sealing position in which the opposed work surfaces engage the opposite outer surfaces of the sealing area of the end closure of a carton located at the station in a clamping relationship; means for sequentially moving cartons through the welding and sealing station with the end closure of the carton folded closed with the variations in the thicknesses of the layers in the sealing area such that a predetermined minimum clamping pressure can be reached in the portions of the sealing area of minimum thickness while at the same time the pressure in the portions of the sealing area of maximum thickness does not exceed a predetermined maximum pressure, the predetermined maximum pressure and the predetermined minimum pressure defining a range of clamping pressures, and the opposed work surfaces do not penetrate the layers; said horn and anvil being in their retracted inactive positions with respect to each other when a carton is not located at the welding and sealing station; and a control circuit operable in response to advancement of a carton to the welding and sealing station to sequentially: (1) pre-trigger said horn to energize it and cause it to vibrate at said predetermined frequency, (2) move the work surfaces of the anvil and vibrating horn toward each other to apply clamping to the sealing area of the end closure without penetrating the layers, (3) stop the relative movement of the work surfaces toward each other when the clamping pressure at the portion of the sealing area of minimum thickness reaches the predetermined minimum pressure to prevent the clamping pressure at the portions of the sealing area of maximum thickness from exceeding the predetermined maximum pressure, (4) hold the energized horn and anvil in the clamping and sealing position for a predetermined period of time to activate the thermoplastic coating of the sealing area to flow, the clamping pressures in the portions of the sealing area being allowed to vary within said range from the clamping pressures in other portions of the sealing area, (5) deenergize the horn to terminate the vibration thereof, (6) thereafter hold the anvil and deenergized horn in the clamping and sealing position for a predetermined period of time to permit the activated thermoplastic coating to cool and set and form a seal between the layers of the end closures, (7) and then return the horn and anvil to their retracted inactive positions with respect to each other to permit the carton to advance from the welding and sealing station.

4. Apparatus as claimed in claim 3 wherein at least one of said work surfaces is relieved in the area of maximum thickness of the layers to maintain the clamping pressure on the layers between said predetermined minimum and maximum pressures.

5. Apparatus as claimed in claim 3 wherein both of said work surfaces are flat.

* * * * *